United States Patent
Isom

(10) Patent No.: US 6,805,232 B1
(45) Date of Patent: Oct. 19, 2004

(54) APPARATUS AND METHOD FOR DIRECTING AND CUSHIONING ITEMS DURING PILING

(76) Inventor: Ralph Isom, 4735 W. 17th North, Idaho Falls, ID (US) 83402

( * ) Notice: Subject to any disclaimer, the term of this patent is extended or adjusted under 35 U.S.C. 154(b) by 106 days.

(21) Appl. No.: 10/461,535

(22) Filed: Jun. 12, 2003

(51) Int. Cl.$^7$ .............................................. B65G 47/04
(52) U.S. Cl. ...................................... 198/534; 198/956
(58) Field of Search ................................ 198/534, 529, 198/956

(56) References Cited

U.S. PATENT DOCUMENTS

| | | | |
|---|---|---|---|
| 1,886,295 A | 11/1932 | Morris | |
| 3,578,146 A | 5/1971 | Mehischau | |
| 4,069,928 A | 1/1978 | Teske et al. | |
| 4,163,490 A | * 8/1979 | Timm | 198/534 |
| 4,225,031 A | 9/1980 | Frisbie et al. | |
| 4,501,350 A | 2/1985 | Muller et al. | |
| 4,678,076 A | * 7/1987 | Nenakhov et al. | 198/956 |
| 4,711,357 A | 12/1987 | Langenbeck et al. | |
| 5,575,316 A | 11/1996 | Pollklas | |
| 5,871,080 A | 2/1999 | Manzi et al. | |
| 5,897,677 A | * 4/1999 | Flynn | 198/534 |
| 6,068,105 A | 5/2000 | Darwish et al. | |
| 6,444,936 B1 | 9/2002 | Ludwig et al. | |
| 6,505,729 B2 | 1/2003 | Timings | |

* cited by examiner

Primary Examiner—James R. Bidwell
(74) Attorney, Agent, or Firm—Hopkins Roden Crockett Hansen & Hoopes, PLLC

(57) ABSTRACT

The invention is an apparatus and method for directing and cushioning a plurality of items, particularly potatoes, conveyed from an elevated source into a piling area beneath the elevated source. The apparatus includes: a frame connecting to the elevated source; an arm connected to the frame at a first connection area; and a directing and cushioning element operatively connected to the arm at a second connection area, the element containing (1) a bracket member and (2) a plurality of resilient, curved fingers connected to the bracket member, each finger with at least a portion thereof disposed beneath an initial drop area adjacent to the elevated source. The method relates to the dropping of, directing of, and absorbing of kinetic energy from an item among the plurality of items as the item contacts portions of the apparatus.

49 Claims, 8 Drawing Sheets

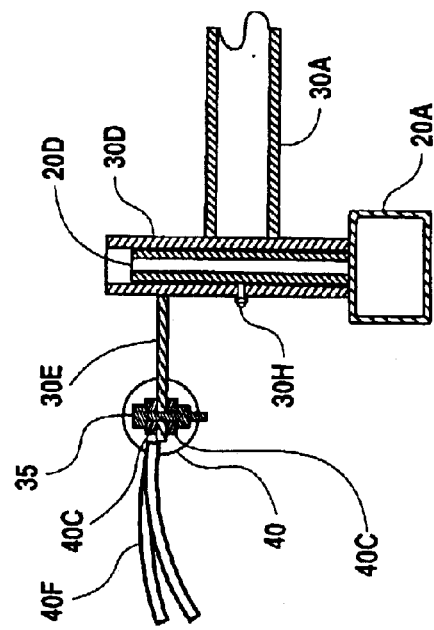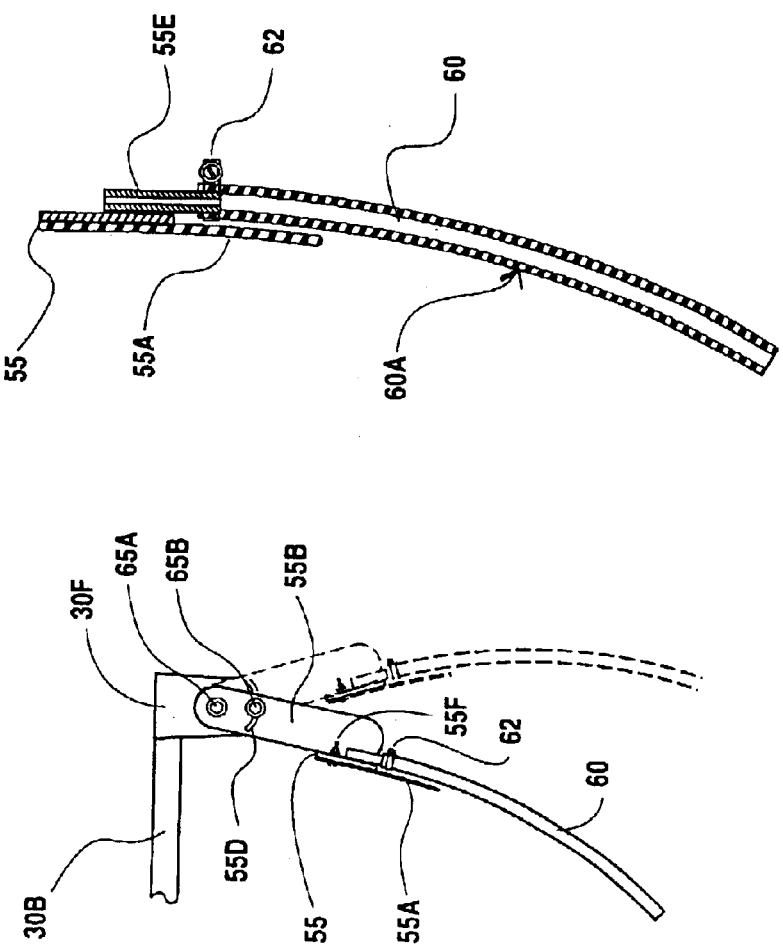

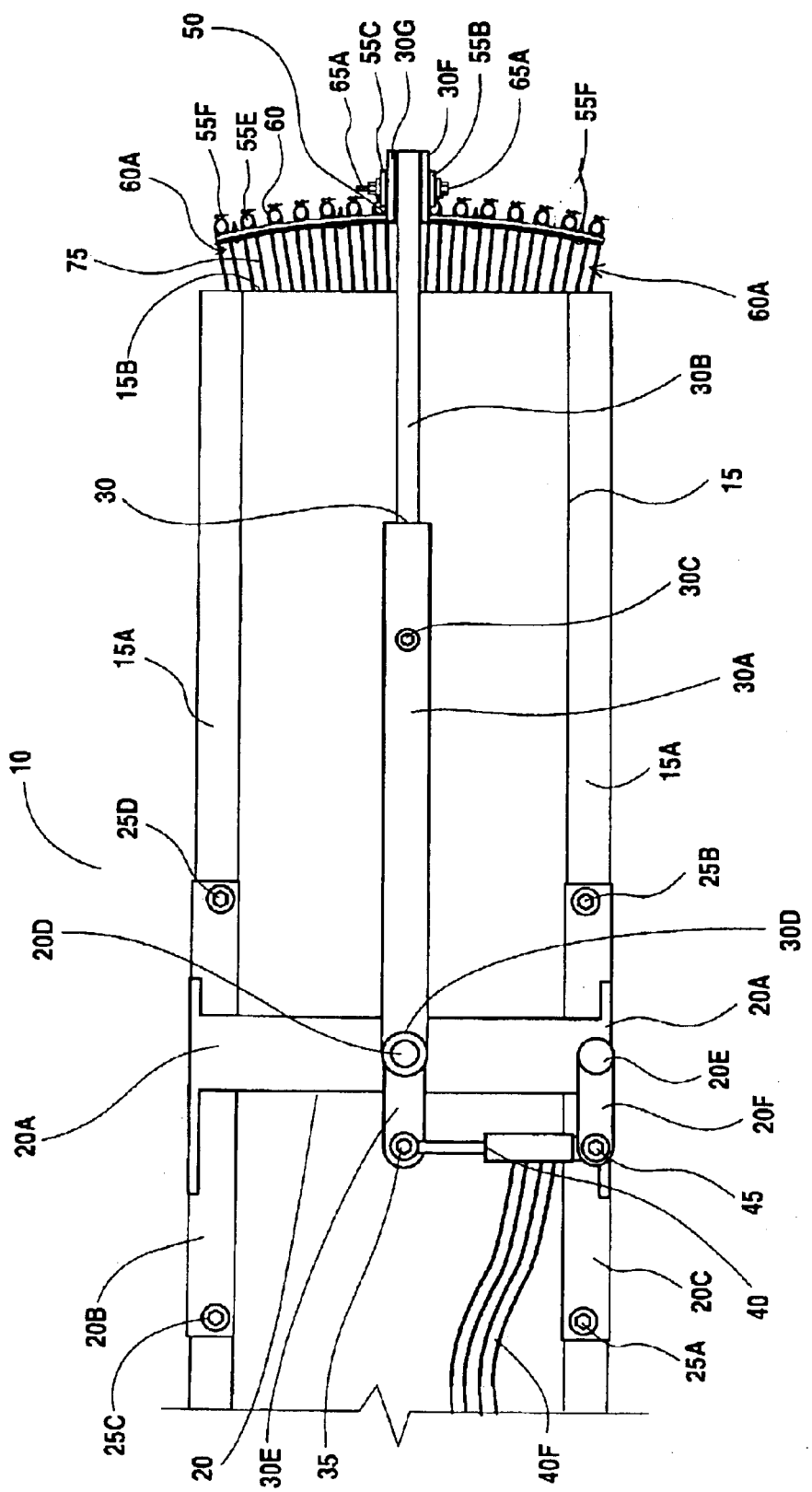

APPARATUS AND METHOD FOR DIRECTING AND CUSHIONING ITEMS DURING PILING

TECHNICAL FIELD

This invention relates to an apparatus and method for directing and cushioning a plurality of items conveyed from an elevated source into a piling area beneath the elevated source. More specifically, the invention relates to an apparatus and method for directing and cushioning ellipsoidal items, particularly potatoes, which may be damaged or bruised when dropped from an elevated source into a pile beneath that elevated source.

BACKGROUND OF THE INVENTION

Commercial processes for harvesting potatoes are well known. In a typical practice, potatoes are removed from the earth by a mechanized harvester and travel on conveying means associated with the harvester to an elevated source, like, for example, a potato harvester boom, and are then dropped from the elevated source and piled into means for transporting, the means for transporting frequently being a truck having a bed with a conveyor system therein. After being first piled into the truck's bed, potatoes may then be transported to either a storage or processing site, the storage site frequently being a potato cellar. After arrival at the cellar, the potatoes are typically conveyed from said means for transporting into a hopper of a potato piling mechanism. The potato piling mechanism often comprises of a series of connected hoppers and conveying means which collect and transport the potatoes to a terminal end where the potatoes drop from the potato piling mechanism and fall into a pile below. Potatoes may accordingly be piled and re-piled during harvest, transportation, storage and ultimate processing for consumption.

A potato dropped from a height into a pile below may be bruised and damaged, with the likelihood and extent of damage based on various factors. These factors include, among others, the kinetic energy the potato attains as it is dropped, the force with which the potato strikes the pile into which it is dropped, the number of times the potato is dropped and the force and energy the potato absorbs when other potatoes strike it. Bruising not only adversely impacts the aesthetic appearance of affected potatoes and potentially the market price thereof, it can, among other adverse consequences, result in increased storage loss, increased trim loss and reduced quality of final product. Reduction of bruising and related damage during harvest, transportation, storage and ultimate processing for consumption is accordingly a matter of significant importance in the commercial potato industry.

Various inventions to reduce potato bruising and damage have accordingly been proposed. Most involve rather complicated means for modifying the elevation of the elevated source or the invention itself. In addition, other art, particularly art from outside the potato processing field, teaches some general structural and operational features of the present invention. While various devices include some of the general structural and operational features of the instant invention, however, no previously known device includes the overall structural and functional features of the instant invention.

These overall structural and functional features promote efficiency, simplicity and ease of operation and allow the present invention to detachably connect with an elevated source to reduce bruising, and to facilitate a greater degree of precision and operator control in piling items dropped from said elevated source to a piling area below said source. No previously known device teaches the directing and cushioning element of the present invention with its particular plurality of resilient, curved fingers or the particular combination of said plurality's shape, composition, arrangement, manner of disposition and manner of integration with other parts of the apparatus. This functional combination produces a durable, efficient and comparatively simple apparatus capable of gently contacting items falling from said elevated source, absorbing kinetic energy from said items, reducing the velocity thereof and directing said items to a modified path further from vertical than an unmodified path the items would take absent contact with the fingers. Neither does any previously known invention contain the combination of the foregoing features with means for selectively pivoting said directing and cushioning element about an axis available in various embodiments of the present invention.

SUMMARY OF THE INVENTION

It is an object of this invention to provide an apparatus for directing and cushioning a plurality of items conveyed from an elevated source into a piling area beneath said elevated source. More specifically, it is an object of this invention to provide an apparatus for directing and cushioning ellipsoidal items, particularly potatoes, which may be damaged or bruised when dropped from an elevated source into a pile beneath that elevated source. The apparatus comprises: a flame, the frame being operatively connected to the source; an arm, the arm being operatively connected to said frame at a first connection area; and a directing and cushioning element operatively connected to the arm at a second connection area by means for attaching, the directing and cushioning element comprising: (1) a bracket member; and (2) a plurality of resilient, curved fingers operatively connected to the bracket member by means for affixing, each finger among the plurality of fingers being displaced with at least a portion thereof beneath an initial drop area at an operator-controlled, predetermined distance and at an operator-controlled, predetermined, non-vertical angle. In various preferred embodiments, the apparatus further comprises means for selectively pivoting said arm around said first connection area with said frame.

Another object of this invention is to provide an apparatus in accordance with the preceding paragraph wherein said plurality of resilient, curved fingers are capable of gently contacting items among a plurality of items falling from said elevated source, thereby absorbing kinetic energy from said items, reducing velocity of said items and directing said items to a modified path further from vertical than an unmodified path said items would take absent contact with said fingers.

Another object of this invention is to provide an apparatus in accordance with the preceding paragraphs wherein said plurality of fingers' shape, composition, arrangement, manner of disposition and manner of integration with other parts of the apparatus facilitate the contacting, absorbing, reducing and directing functions of the previous paragraph without significant need for energy input from an external source.

Another object of certain preferred embodiments of this invention is to provide both a structure and means for selectively pivoting said directing and cushioning element around an axis and to thereby provide an operator a greater degree control and precision in directing the items as said items drop from said source into a piling area beneath said source.

Another object of this invention is to provide the ease, convenience, flexibility and cost savings of an apparatus which is easily detached from a first elevated source and attached to a second elevated source without significant impact or damage to either source and without undue expenditure of time or effort.

Another object of this invention is to provide an apparatus and method in accordance with the preceding objects which is capable of reducing damage and bruising to a potato and assisting in the directing and cushioning of a potato conveyed from an elevated source into a piling area beneath said elevated source even absent associated means for modifying the elevation of said elevated source or the apparatus itself.

Another object of this invention is to provide an apparatus in accordance with the preceding objects which will conform to conventional forms of manufacture, be of comparatively simple construction and easy to use so as to provide a device that will be economically feasible, durable and relatively free of trouble in operation.

These together with the other objects and advantages of the invention which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 7 is a partial view of a portion of an arm and a directing and cushioning element of the apparatus of the present invention with an alternate position of said directing and cushioning element shown in phantom lines.

FIG. 8 is a sectional view taken through line 8—8 of FIG. 6.

FIG. 9 is a partial sectional view taken through line 9—9 of FIG. 6.

FIG. 10 is a top plan view of an alternate embodiment of the apparatus of the present invention shown attached to an elevated source from which items are conveyed into a piling area below said source.

DETAILED DESCRIPTION OF THE INVENTION

Figure 1:
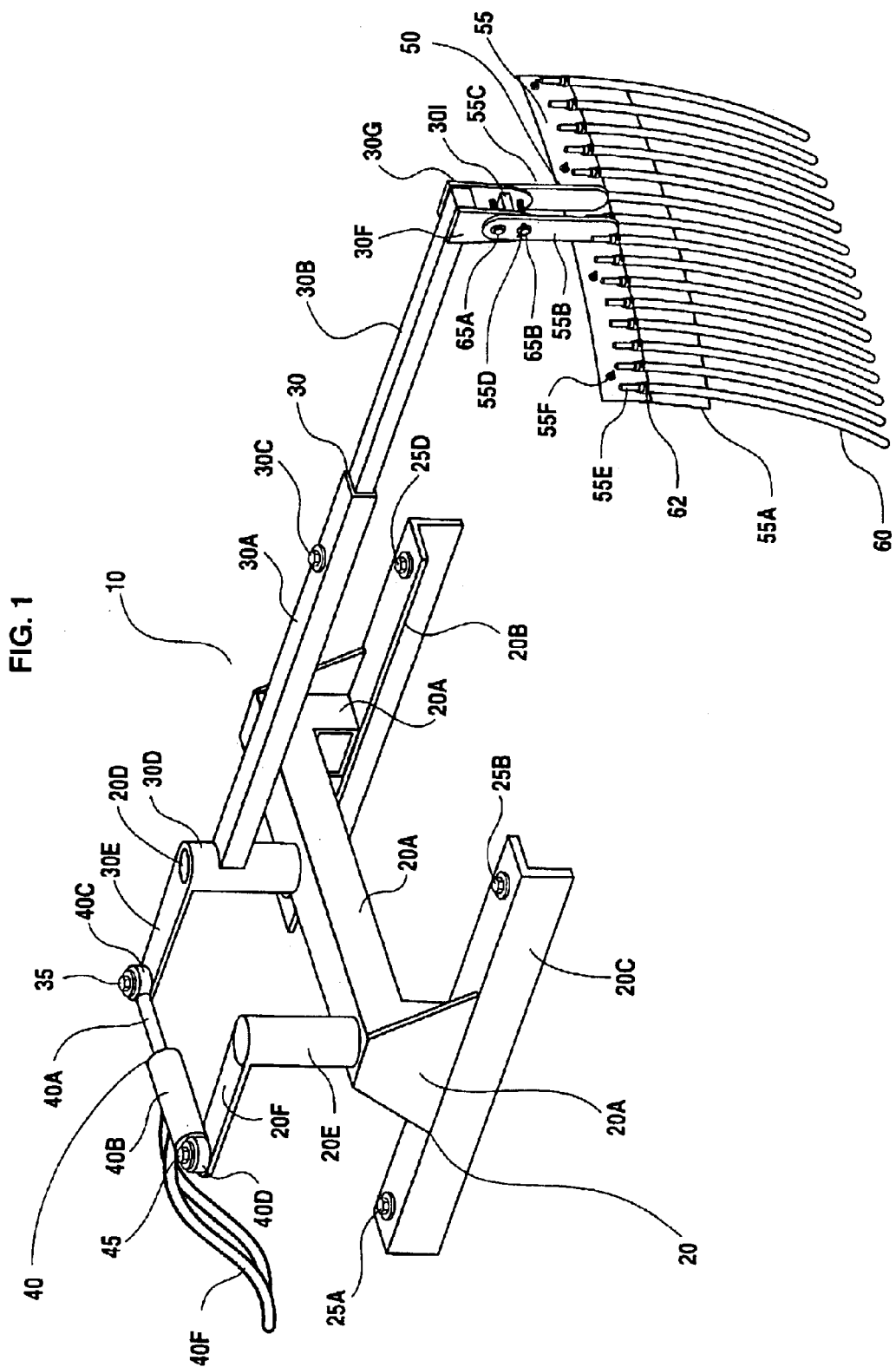
FIG. 1 is a perspective view of the apparatus of the present invention.

FIG. 1 illustrates a preferred embodiment of an apparatus 10 for directing and cushioning items during piling. In standard operation, the apparatus 10 is operatively connected to an elevated source, said elevated source comprising a portion of a conveyor system, conveyer belt, conveyer chain, boom, piler or other equivalent means for conveying items to an initial drop area above a piling area, said elevated source being referred to in general by numeral 15 in FIGS. 2 and 10.

Further shown in FIGS. 1, 2, 6 and 10 is a frame 20 of a preferred embodiment of said apparatus 10, said frame having a central member 20A, a first side member 20B and a second side member 20C, each of said side members 20B, 20C rigidly and perpendicularly connecting with said central member 20A at one of two regions on said central member 20A, each of said two regions being proximate opposite ends of said central member 20A and thereby forming a combination which, when observed in top plan view (FIG. 2, FIG. 6, FIG. 10), has a generally I-shaped array. It is to be appreciated, however, that alternative embodiments may utilize alternate arrays.

With attention directed to FIGS. 1, 2, 6, 9 and 10, it is seen that the frame 20 may additionally comprise an arm retaining member 20D. In the embodiments illustrated in FIGS. 1, 2, 6, 9 and 10, said arm retaining member 20D rigidly connects with said central member 20A of said frame 20 and, during standard operation, is disposed upward away from said rigid connection with said central member 20A to a distal end of said arm retaining member 20D. The frame 20 of the embodiments shown in FIGS. 1, 2, 6 and 10 may further comprise a pivot means support member 20E. In the embodiments shown in FIGS. 1, 2, 6 and 10, said pivot means support member 20E rigidly connects with said central member 20A of said frame 20 and during standard operation is disposed upward away from said rigid connection with said central member 20A to a distal end of said pivot means support member 20E. It is to be appreciated that the frame 20 may be formed by rigidly connecting initially separate components or, alternatively, by manufacturing said frame 20 as a single, integral piece of rigid material.

Figure 2:
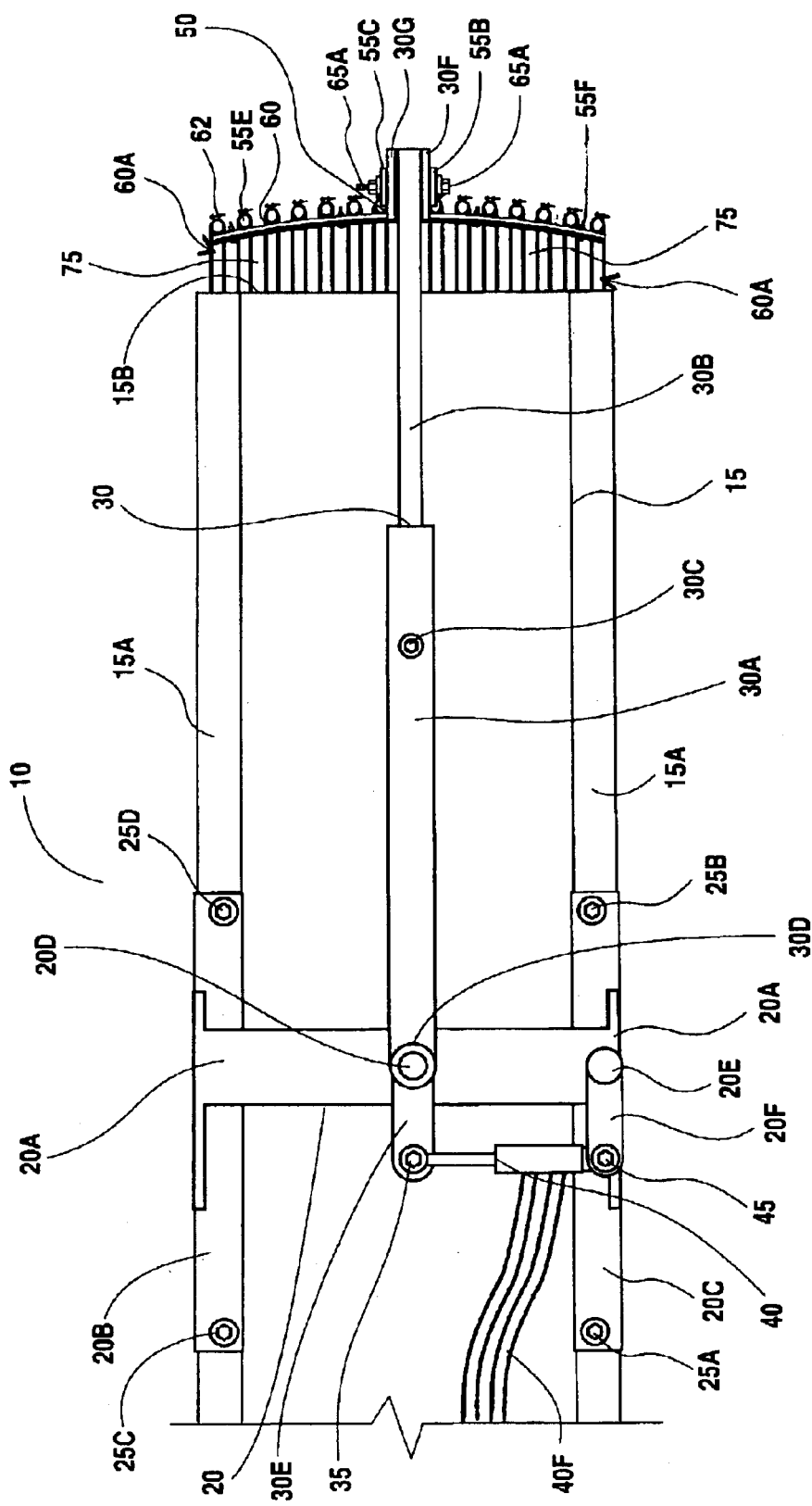
FIG. 2 is a top plan view of the apparatus of the present invention shown attached to an elevated source from which items are conveyed into a piling area below said source.

Referring to FIGS. 2 and 10, said frame 20 of the apparatus 10 operatively connects to a frame portion 15A of said elevated source 15 by means for securely connecting said frame 20 to said source 15, said means for securely connecting comprising one or more fasteners 25A, 25B, 25C, 25D. In the particular embodiments shown (FIG. 1, FIG. 2, FIG. 3, FIG. 6, FIG. 10), each fastener 25A, 25B, 25C, 25D is a threaded bolt having one or more threaded nuts rotatably connected thereto, though said fasteners may comprise any other generally equivalent means for securely and detachably connecting said frame 20 to said source 15.

Further shown in FIGS. 1, 2, 3, 6 and 10 is an arm 30, with a first arm end and a second arm end opposite said first arm end, the particular embodiment illustrated comprising a plurality of adjustable arm members, said plurality of adjustable arm members including a tubular first arm member 30A and a second arm member 30B, said second arm member 30B being slidingly insertable into an internal passageway within said first arm member 30A and thereby allowing an operator to selectively adjust total length of the arm 30. Once a desired total arm length is selected, said length is held constant by means for locking, the means for locking shown in the particular embodiment illustrated in FIGS. 1, 2, 3, 6 and 10 comprising a locking screw 30C rotatably insertable in a threaded passageway, said threaded passageway extending through a side of said first arm member 30A into the internal passageway containing a portion of said second arm member 30B. When tightened, said locking screw presses against said second arm member 30B thereby holding said second arm member in place and the total length of said arm 30 constant. It is, however, to be appreciated that non-adjustable embodiments of the arm 30 can be formed from a single, integral piece of rigid material. Similarly, in other non-adjustable embodiments, the arm 30 and the frame 20 can be mutually formed from a single, integral piece of rigid material.

During standard operation of the embodiments illustrated in FIGS. 1, 2, 3, 6, 9 and 10, said arm 30 pivotally connects to said frame 20 at a first connection area. In the embodiments shown in FIGS. 1, 2, 6, 9 and 10, said arm 30 additionally comprises an arm pivot member 30D, said arm pivot member 30D connecting to an arm pivot member connection area on said arm 30 and being disposed away from said arm pivot member connection area and toward said first connection area with said arm retaining member 20D of said frame 20. In the particular embodiments shown in FIGS. 1, 2, 6, 9 and 10, the arm pivot member connection area is proximate to said first end of said arm 30. It is, however, to be appreciated that in alternative embodiments, said arm pivot member connection area may be located in a position more proximate to said second arm end and intermediate to said first and second arm ends.

In the particular embodiments shown in FIGS. 1, 2, 6, 9 and 10, said arm pivot member 30D has an end with a cavity therein, a portion of said arm retaining member 20D of said frame 20 being insertable into said cavity and thereby forming a pivoting connection at a first connection area between said arm 30 and said frame 20. The pivoting connection at said first connection area may alternatively be formed when said cavity of said arm retaining member is located within an end of said arm retaining member 20D of said frame 20 with said arm pivot member 30D of said arm 30 having a journaled end insertable into said cavity. Lubricants assist in facilitating pivotal movement of the arm 30 with respect to the frame 20 at said first connection area and are introduced through a grease zirk 30H (FIG. 9). It is, however, to be appreciated that in non-pivoting embodiments of the invention, said arm 30 rigidly attaches to said frame 20 at said first connection area.

In various preferred embodiments of the invention, said arm 30 operatively connects to means for selectively pivoting said arm 30 around said first connection area with said frame 20. In the embodiments so forth in FIGS. 1, 2, 3, 6, 9 and 10, an arm pivot tab 30E rigidly attaches to said arm pivot member 30D and is disposed away from said attachment with said arm pivot member 30D along a portion of a line perpendicular to an axis around which said arm 30 pivots. The arm pivot tab 30E has a hole with a first ram pin 35 being insertable therein through. The arm pivot tab 30E pivotally connects to a ram 40, the ram 40 comprising a piston 40A and a cylinder 40B and having two opposite ram ends, each of said ram ends having at least one ram tab 40C, 40D proximate thereto and rigidly connected therewith, each ram tab 40C, 40D having a hole therein. The pivotal connection between said arm pivot tab 30E and said ram 40 is accordingly formed when said first ram pin 35 is inserted through the hole in said arm pivot tab 30E and into at least one hole through said at least one ram tab 40C proximate a first rain end. In the embodiments set forth in FIGS. 1, 2, 3, 6 and 10, the ram 40 pivotally and operatively connects to said frame 20 as follows: (1) A ram connecting member 20F having a hole with a second ram pin 45 being insertable therein through rigidly attaches to said pivot means support member 20E of said frame 20 and is disposed away from said attachment with said pivot means support member 20E; and (2) said second ram pin 45 is inserted into the hole in said ram connecting member 20F and into at least one hole through said at least one ram tab 40D proximate a second ram end, said second ram end being distally located from said first ram end.

Figure 6:
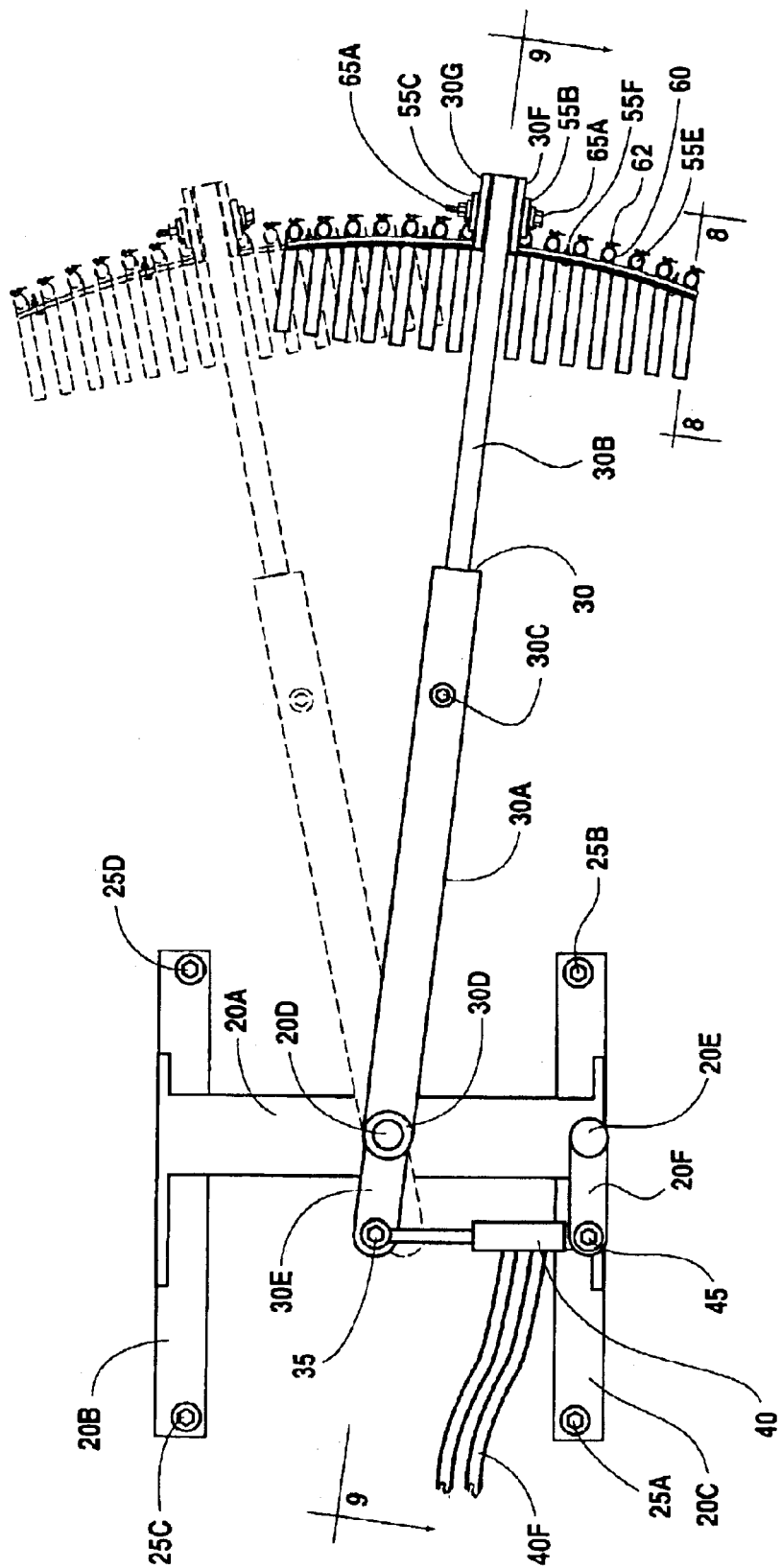
FIG. 6 is a top plan view of the apparatus of the present invention with an alternate position shown in phantom lines.

In the embodiments set forth in FIGS. 1, 2, 6 and 10, said ram 40 is a hydraulic ram operatively connected to a hydraulic motor associated with said source 15 by one or more hydraulic lines 40F disposed toward an operative connection with said hydraulic motor. During operation, said ram 40 may be selectively extended or retracted by the operator and thereby drives said means for selectively pivoting said arm 30 around said first connection area with said frame 20 (FIG. 6). During standard operation, said arm 30 pivots in a plane which is horizontal or slightly angled from horizontal. Preferred results are obtained when the angle of said plane is no greater than 35° from horizontal. The selectively pivotal connection between said arm 30 and said frame 20 and associated means for selectively pivoting said arm 30 around said first connection area function to provide the operator a greater degree of control and precision in directing and cushioning said plurality of items as said plurality of items is dropped into a piling area beneath said elevated source 15.

Figure 3:
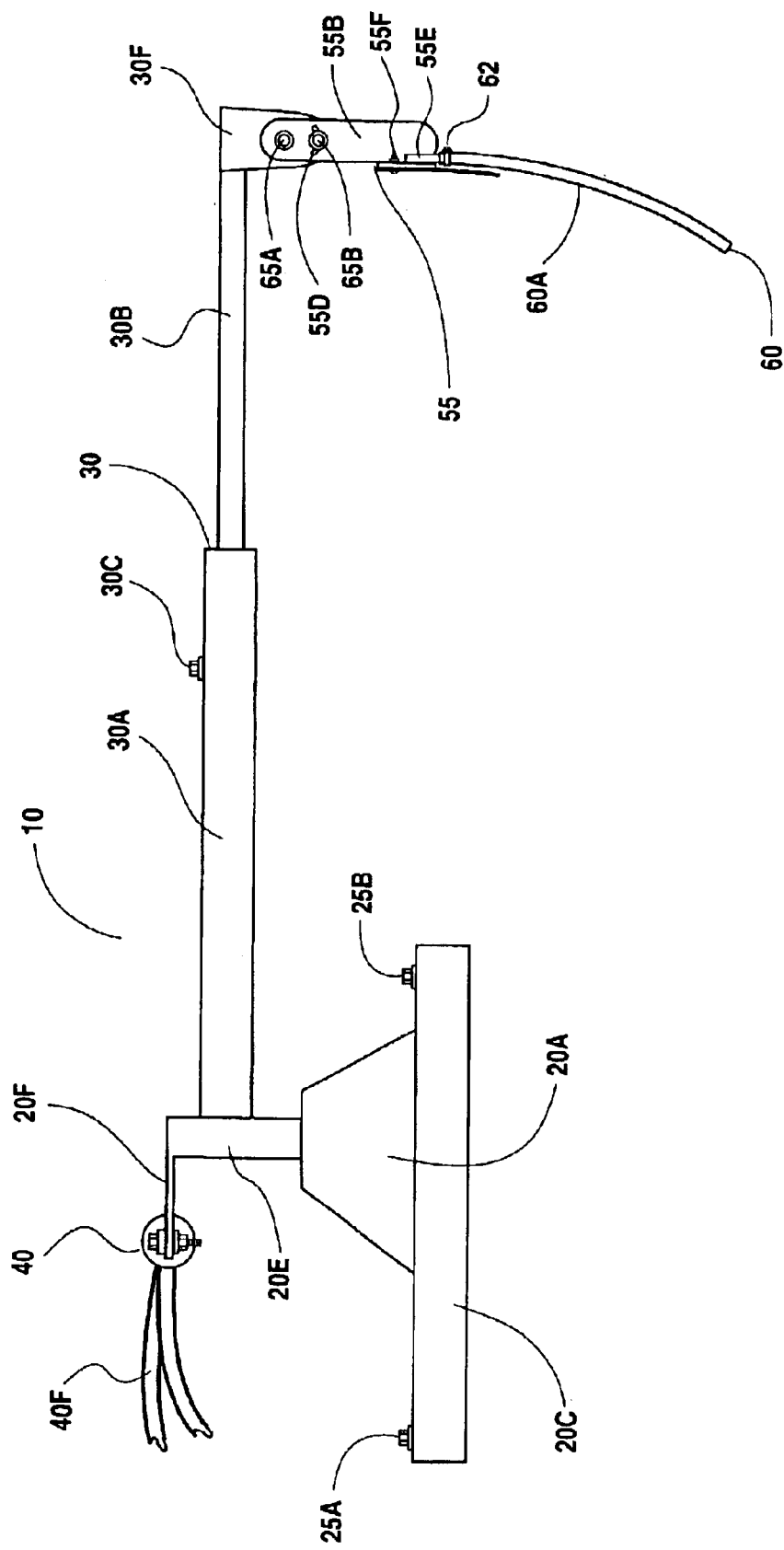
FIG. 3 is an elevated side plan view of the apparatus of the present invention.
Figure 4:
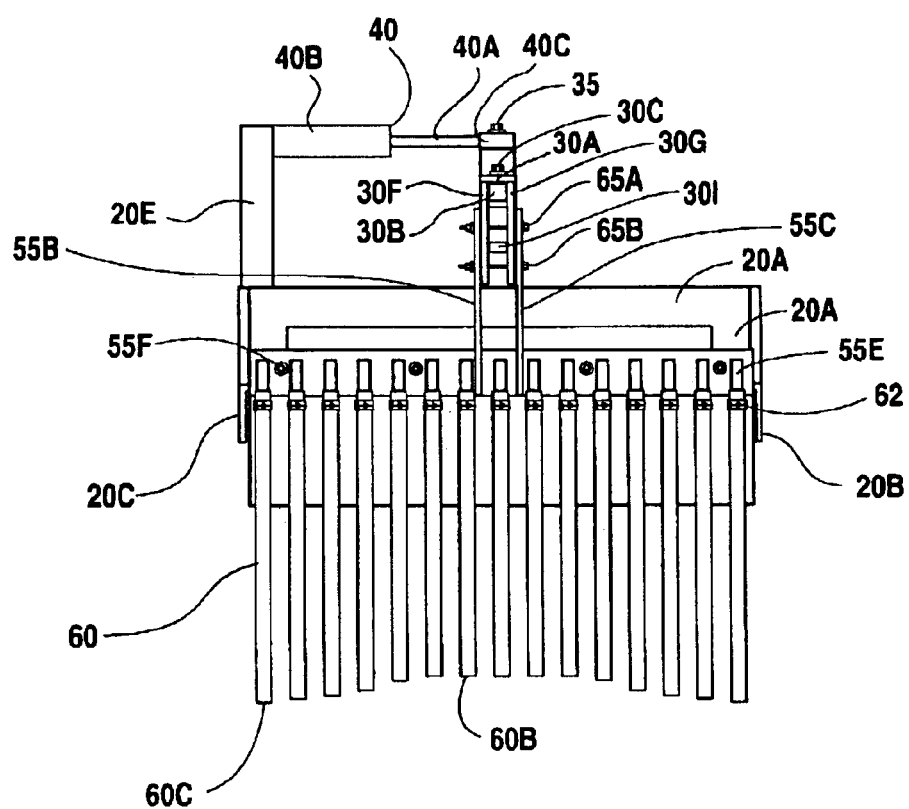
FIG. 4 is a front plan view of the apparatus of the present invention.

Further shown in FIGS. 1, 2, 3, 4, 5, 6 and 7 is a directing and cushioning element 50 comprising: (1) a bracket member 55 having an inner surface and an outer surface; and (2) a plurality of resilient, curved fingers, each finger 60 among said plurality of fingers operatively connecting to said bracket member 55 by means for affixing. In the embodiments illustrated in FIGS. 1, 2, 3, 6, 8 and 10, said bracket member 55 has an elastomeric cushioning sub-element 55A operatively connected thereto and integrated therein, said cushioning sub-element forming a cushioned inner surface of said bracket member 55 which protects the remainder of said bracket member 55 and cushions items which contact said inner surface of said bracket member 55. As shown in the embodiments of FIGS. 1, 4 and 9, the cushioning sub-element 55A may extend downward from a connection with the remainder of said bracket member 55 and is adjoined to the remainder of said bracket member by a plurality of cushioning sub-element fasteners 55F, adhesive or a combination thereof.

As seen with embodiments of FIGS. 1, 2, 3, 4, 5, 6, 7 and 10, said bracket member 55 may additionally comprise a first bracket member attachment tab 55B and a second bracket member attachment tab 55C, each of said bracket member attachment tabs 55B, 55C rigidly connecting to the remainder of said bracket member 55 and facilitating an operative connection between said directing and cushioning element 50 and said arm 30. As seen in the top plan views of FIGS. 2, 6 and 10, an inner surface of said bracket member 55 in various preferred embodiments of the invention is concave and may, as in FIG. 6, correspond to a portion of a circle circumscribed about an axis around which said arm 30 pivots when driven by said means for selectively pivoting said arm 30 around said first connection area with said frame 20.

FIGS. 1, 2, 3, 4, 5, 6, 7 and 10 illustrate means for attaching said directing and cushioning element 50 to said arm 30, said means for attaching comprising one or more adjustable fasteners 65A, 65B. In the embodiments shown in FIGS. 1, 2, 3, 4, 5, 6, 7 and 10, said adjustable fasteners 65A, 65B are threaded bolts and corresponding threaded nuts, each bolt having a bolt head proximate a first bolt end and being disposed though a hole in said first bracket member attachment tab 55B, through a hole in a first arm attachment tab 30F, through a hole in a second arm attachment tab 30G, and through a hole (not shown) in said second bracket member attachment tab 55C, said bolt having a threaded bolt tail distally disposed from said bolt head, said threaded bolt tail engaging the corresponding threaded nut. When tightened, said adjustable fasteners 65A, 65B thus firmly attach the directing and cushioning element 50 to said arm 30. As shown in FIGS. 1 and 4, an attachment reinforcing element 301 rigidly connects at a first end to said first arm attachment tab 30F and at a second end opposite said first end to said second arm attachment tab 30G and functions to provide lateral support to said first arm attachment tab 30F and said second arm attachment tab 30G. The first arm attachment tab 30F and the second arm attachment tab 30G rigidly connect to the remainder of said arm at a second connection area on said arm 30, said second connection area being more proximate said second arm end than said arm pivot connection point is to said second arm end.

As seen in FIG. 7, the operator may selectively control and modify an angle at which the directing and cushioning element 50 connects to said arm 30 by loosening said adjustable fastener 65B within an arcuate hole 55D, then shifting said directing and cushioning element 50 to a desired angular attachment to said arm 30, and finally tightening said adjustable fastener 65B to securely fasten said directing and cushioning element 50 in the desired angular attachment with said arm 30.

In a preferred embodiment shown in FIGS. 2, 6 and 10, said bracket member 55 is arcuate with the inner surface of said bracket member 55 being concave and the outer surface of said bracket member 55 being convex. Ideal results are obtained in an embodiment like that shown in FIG. 6, wherein the arcuate shape of said bracket member 55 corresponds to a portion of a circle circumscribed about said axis around which said arm 30 rotates.

Referring further to the embodiments in FIGS. 1, 2, 3, 4, 5, 6, 7, 8 and 10, each finger 60 among said plurality of resilient, curved fingers is operatively connected to said bracket member 55 of said directing and cushioning element 50 by means for affixing. Said means for affixing said finger 60 to said bracket member 55 comprises one or more finger engaging sub-elements 55E and may additionally comprise means for securing. In the embodiment illustrated in FIG. 7, each finger engaging sub-element 55E is a male part operatively connected to said bracket member 55 and insertable into a female part within a corresponding finger 60. In the embodiment shown in FIG. 7, said finger engaging sub-element 55E rigidly attaches to said bracket member 55 and is inserted into said female part within said finger 60 and the connection between said finger engaging sub-element 55E and said finger 60 is further secured by said means for securing, said means for securing comprising a hose clamp 62. It is, however, to be appreciated that said means for affixing comprise additional detachable connection arrangements between male and female parts (including slot-and-rail, plug-and-socket, hook-and-latch, screw-and-threaded receptacle) and other functionally equivalent arrangements. It is further to be appreciated that the male part can likewise be positioned on the finger 60 and the corresponding female part within said bracket member 55 and that said means for affixing includes this alternate arrangement for connecting said finger 60 to said bracket member 55. Said means for affixing may further comprise a bolt with a corresponding threaded nut and other functionally equivalent fasteners.

Figure 5:
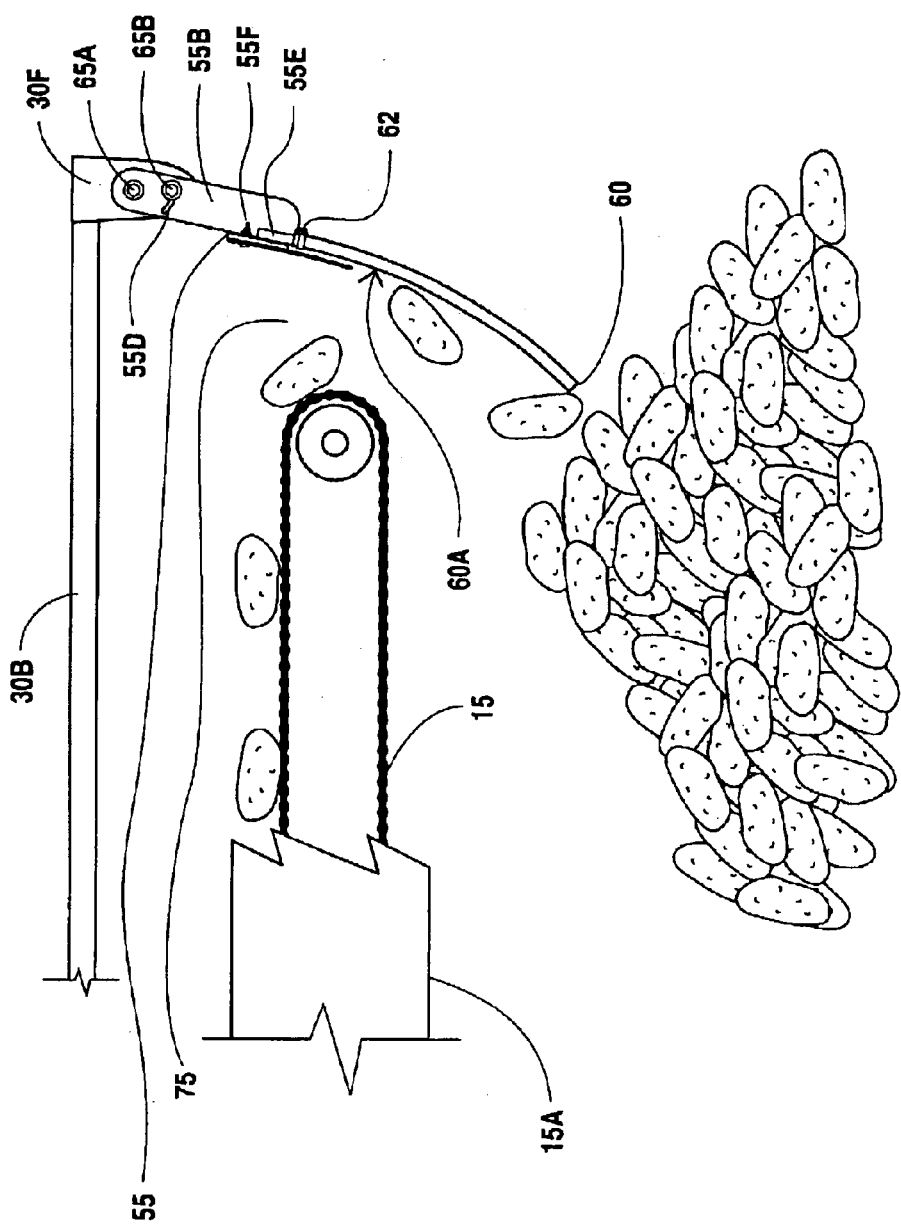
FIG. 5 is a partial cutaway side plan view of a part of the apparatus of the present invention shown with a cutaway portion of said elevated source.

As further seen in FIGS. 1, 2, 3, 5, 6, 7 and 8, each finger 60 among said plurality of resilient, curved fingers curves away from said finger's connection with said bracket member 55 and is disposed with at least a portion of said finger 60 beneath an initial drop area 75 (FIG. 2, FIG. 5, FIG. 10) at an operator-controlled, predetermined distance and at an operator-controlled, predetermined, non-vertical angle such that as an item among said plurality of items falls from said source 15 and contacts said finger 60 on a contact surface 60A (FIG. 2, FIG. 5, FIG. 10) of said finger 60, said item is gently directed to a modified path further from vertical than an unmodified path said item would take absent contact with said finger 60 and such that a portion of said item's kinetic energy is gently absorbed by said finger 60 said item contacts. Referring to FIGS. 2, 5 and 10, said initial drop area 75, is bordered on an inner border by a dispensing end 15B of said source 15 and on an outer border by said inner surface of said bracket member 55. In preferred embodiments, said contact surface 60A of said finger 60 is rounded, being semicircular, semi-ovular or otherwise smoothly curved along said contact surface's horizontal dimension. As seen in FIG. 7, the operator may selectively control both the predetermined distance from the initial drop area 75 to the contact surface 60A of said finger 60 and the predetermined, non-vertical angle of said contact surface 60A by loosening said adjustable fastener 65B within said arcuate hole 55D, then shifting said directing and cushioning element 50 to a desired angular attachment to said arm 30, and finally tightening said adjustable fastener 65B to fasten said directing and cushioning element 50 in the desired angular attachment with said arm 30.

To facilitate performance of the functions noted in the preceding paragraph and to further provide durability, longevity and functionality, fingers 60 among said plurality are composed of durable, resilient, semiflexible materials. In embodiments used to direct and cushion potatoes dropped from said source 15 (FIG. 5), desired results are produced when said fingers 60 are composed of a durable, resilient, semiflexible elastomer, with preferred embodiments of said fingers having said elastomer internally reinforced by wire or metallic mesh. Optimum results were obtained when the fingers were composed of a high pressure hydraulic hose having a neoprene cover, a braided steel core, an outer diameter of at least $1^{13}/_{36}$ inches but no more than $1\frac{1}{2}$ inches, a weight of between 0.80 and 1.40 lbs per foot and a minimum bend radius of no more than 12 feet.

As said item falls from said source 15 contacting said contact surface 60A of said finger 60, said contact surface 60A accordingly deflects temporarily away from a point where said item initially contacts said contact surface 60A thereby facilitating a gentle absorption of a portion of said item's kinetic energy. Following temporary deflection, said resilient materials of said finger function to draw said finger 60 and the contact surface 60A thereof to a position occupied before temporary deflection.

Preferred results are obtained when said finger 60 among said plurality of resilient, curved fingers is disposed during operation such that: (1) said finger 60 is generally parallel to other fingers among said plurality of resilient, curved fingers when observed in top plan view (FIG. 2); and (2) the portion of said resilient, curved finger 60 beneath said initial drop area 75 occupies a position such that a portion of said contact surface 60A initially contacted by said item during fall of said item from said source 15 is at least 15° from vertical and all portions of said contact surface elevationally lower than said portion of said contact surface initially contacted by said item are at least 15° from vertical, being ideally at least 15' but no more than 45° from vertical (FIG. 3, FIG. 5). In an alternate embodiment illustrated in FIG. 10, said plurality of resilient, curved fingers are each disposed inwardly from said finger's connection with said bracket member 55 toward an axis around which said arm 30 pivots when driven by said means for selectively pivoting said arm 30 around said first connection area with said frame 20 when observed in top plan view.

As shown in FIGS. 3 and 5, said contact surface 60A of said finger 60 may be elevationally concave, such that an item dropped from said source contacting said contact surface 60 on successive occasions at successively lower elevations during fall encounters successive portions of said contact surface 60A which are increasingly angled away from vertical. Such elevational concavity of said contact surface 60A thus facilitates gentle directing of said item as it falls from said source 15 to a modified path further from vertical than an unmodified path said item would take absent contact with said finger 60 and gentle absorption of a portion of said item's kinetic energy by said fingers 60 said item contacts, particularly in circumstances where said item contacts said plurality of resilient, curved fingers on multiple occasions at multiple elevations during fall.

In a preferred embodiment used to direct and cushion Russet potatoes dropped from said source 15 and shown in FIG. 5, preferred results are produced when a finger 60 among said plurality of fingers is disposed during operation such that: (1) a potato dropped from said source 15 falls no more than sixteen inches from the initial drop area 75 and preferably less than twelve inches before initially contacting a finger 60 among said plurality of fingers; and (2) a portion of said finger among said plurality of fingers most proximate a most proximate portion of a closest, neighboring finger is at least 2¼ inches but no more than 2¾ inches distant from said most proximate portion of said closest, neighboring finger. Such features, particularly when combined with those described in the preceding paragraphs, reduced the incidence of potato bruising and function to effectively and efficiently direct and cushion said potatoes as said potatoes are dropped from said source to the piling area beneath said source.

In the embodiment of the invention shown in FIG. 4, said plurality of resilient, curved fingers 60 are of varying lengths, with a more laterally located finger 60B being longer than a more medially located finger 60C. Said arrangement of said plurality of fingers 60 in FIG. 4 has particular utility when the plurality of items conveyed from said elevated source are ellipsoidal and tend to form an approximately conic pile as shown in FIG. 5 as the arrangement allows an item falling a distance toward a more lateral portion of the pile more vertically distant from the initial drop area 75 than a more medially located apex of said pile to contact the comparatively longer, more laterally located finger 60C (FIG. 4, FIG. 5).

The foregoing is considered as illustrative only of the principles of the invention. Further, since modifications and changes will readily occur to those skilled in the art, it is not desired to limit the invention to the exact construction and operation shown and described, and, accordingly, all suitable modifications and equivalents may be resorted to, falling within the scope of the invention. In addition to the elastomeric materials and to the durable, resilient, semiflexible materials noted in the preceding paragraphs of this detailed description of the invention, the materials used in construction of said invention are metallic elements, metallic alloys, and polymers which provide strength, durability and rust resistance.

What is claimed is:

1. An apparatus for directing and cushioning a plurality of items conveyed from an elevated source into a piling area beneath said source, comprising:
   a) a frame, said frame operatively connecting to said source;
   b) an arm with a first arm end and a second arm end opposite said first arm end, said arm pivotally and operatively connecting to said frame at a first connection area;
   c) means for selectively pivoting said arm around said first connection area with said frame; and
   d) a directing and cushioning element operatively connecting to said arm at a second connection area by means for attaching, said directing and cushioning element comprising:
      i) a bracket member having an inner surface and an outer surface;
      ii) a plurality of resilient, curved fingers operatively connected to said bracket member by means for affixing; and
   wherein a finger among said plurality of resilient, curved fingers is disposed with at least a portion of said finger beneath an initial drop area at an operator-controlled, predetermined distance and at an operator-controlled, predetermined, non-vertical angle, such that as an item among 19 said plurality of items falls from said source and contacts said finger on a contact surface of said finger said item is directed to a modified path further from vertical than an unmodified path said item would take absent contact with said finger and such that a portion of said item's kinetic energy is absorbed by said finger said item contacts.

2. An apparatus as in claim 1 wherein said bracket member of said directing and cushioning element is arcuate.

3. An apparatus as in claim 2 wherein said inner surface of said bracket member is concave.

4. An apparatus as in claim 2 wherein said bracket member corresponds to a portion of a circle circumscribed about an axis around which said arm pivots when driven by said means for selectively pivoting said arm around said first connection area with said frame.

5. An apparatus as in claim 1 wherein said contact surface of said resilient, curved finger is rounded.

6. An apparatus as in claim 1 wherein said portion of said resilient, curved finger beneath said initial drop area is disposed such that a portion of said contact surface initially contacted by said item during fall of said item from said source is at least 15° from vertical and all portions of said contact surface elevationally lower than said portion of said contact surface initially contacted by said item are at least 15° from vertical.

7. An apparatus as in claim 6 wherein said contact surface of said resilient, curved finger is elevationally concave and all portions of said contact surface elevationally lower than said portion of said contact surface initially contacted by said item are at least 15° but no more than 45° from vertical.

8. An apparatus as in claim 1 wherein said finger among said plurality of resilient, curved fingers is disposed generally parallel to other fingers among said plurality of fingers when observed in top plan view.

9. An apparatus as in claim 1 wherein said finger among said plurality of resilient, curved fingers is disposed inwardly from said finger's connection with said bracket member toward an axis around which said arm pivots when driven by said means for selectively pivoting said arm around said first connection area with said frame when observed in top plan view.

10. An apparatus as in claim 1 wherein:
   a) said bracket member of said directing and cushioning element is arcuate;
   b) said inner surface of said bracket member is concave;
   c) said contact surface of said resilient, curved finger is rounded;
   d) said portion of said resilient, curved finger beneath said initial drop area is disposed such that a portion of said contact surface initially contacted by said item during fall of said item from said source is at least 15° from vertical and all portions of said contact surface elevationally lower than said portion of said contact surface initially contacted by said item are at least 15° from vertical;

e) said contact surface of said resilient, curved finger is elevationally concave; and f) said plurality of resilient, curved fingers are elastomeric.

11. An apparatus as in claim 10 wherein said finger among said plurality of resilient, curved fingers is disposed generally parallel to other fingers among said plurality of fingers when observed in top plan view.

12. An apparatus as in claim 10 wherein said finger among said plurality of resilient, curved fingers is disposed inwardly from said finger's connection with said bracket member toward an axis around which said arm pivots when driven by said means for selectively pivoting said arm around said first connection area with said frame when observed in top plan view.

13. An apparatus as in claim 10 wherein said plurality of resilient, curved fingers are of varying lengths, with a more laterally located finger being longer than a more medially located finger.

14. An apparatus as in claim 10 wherein said arm comprises a plurality of selectively adjustable arm members for selectively adjusting total length of said arm.

15. An apparatus as in claim 1 wherein said predetermined distance is less than 16 inches beneath said initial drop area.

16. An apparatus as in claim 15 wherein a portion of said finger among said plurality of fingers most proximate a most proximate portion of a closest, neighboring finger is at least 2¼ inches but no more than 2¾ inches distant from said most proximate portion of said closest, neighboring finger.

17. An apparatus as in claim 1 wherein:

a) said bracket member of said directing and cushioning element is arcuate;

b) said inner surface of said bracket member is concave;

c) said contact surface of said resilient, curved finger is rounded;

d) said portion of said resilient, curved finger beneath said initial drop area is disposed such that a portion of said contact surface initially contacted by said item during fall of said item from said source is at least 15° from vertical and all portions of said contact surface elevationally lower than said portion of said contact surface initially contacted by said item are at least 15° from vertical;

e) said contact surface of said resilient, curved finger is elevationally concave;

f) said plurality of resilient, curved fingers are elastomeric;

g) said predetermined distance is less than 16 inches beneath said initial drop area; and h) a portion of said finger among said plurality of fingers most proximate a most proximate portion of a closest, neighboring finger is at least 2¼ inches but no more than 2¼ inches distant from said most proximate portion of said closest, neighboring finger.

18. An apparatus as in claim 17 wherein said finger among said plurality of resilient, curved fingers is disposed generally parallel to other fingers among said plurality of fingers when observed in top plan view.

19. An apparatus as in claim 17 wherein said finger among said plurality of resilient, curved fingers is disposed inwardly from said finger's connection with said bracket member toward an axis around which said arm pivots when driven by said means for selectively pivoting said arm around said first connection area with said frame when observed in top plan view.

20. An apparatus as in claim 17 wherein said plurality of resilient, curved fingers are of varying lengths, with a more laterally located finger being longer than a more medially located finger.

21. An apparatus as in claim 17 wherein said arm comprises a plurality of selectively adjustable arm members for selectively adjusting total length of said arm.

22. An apparatus as in claim 17 wherein said predetermined distance is less than 12 inches beneath said initial drop area.

23. An apparatus for directing and cushioning a plurality of items conveyed from an elevated source into a piling area beneath said source, comprising:

a) a frame, said frame being operatively connected to said source;

b) an arm, said arm being rigidly and operatively connected to said frame at a first connection area; and c) a directing and cushioning element operatively connected to said arm at a second connection area by means for attaching, said directing and cushioning element comprising:

i) a bracket member having an inner surface and an outer surface;

ii) a plurality of resilient, curved fingers operatively connected to said bracket member by means for affixing; and wherein a finger among said plurality of resilient, curved fingers is disposed with at least a portion of said finger beneath an initial drop area at an operator-controlled, predetermined distance and at an operator-controlled, predetermined, non-vertical angle, such that as an item among said plurality of items falls from said source and contacts said finger on a contact surface of said finger said item is directed to a modified path further from vertical than an unmodified path said item would take absent contact with said finger and such that a portion of said item's kinetic energy is absorbed by said finger said item contacts.

24. An apparatus as in claim 23, wherein:

a) said bracket member of said directing and cushioning element is arcuate;

b) said inner surface of said bracket member is concave;

c) said contact surface of said resilient, curved finger is rounded;

d) said portion of said resilient, curved finger beneath said initial drop area is disposed such that a portion of said contact surface initially contacted by said item during fall of said item from said source is at least 15° from vertical and all portions of said contact surface elevationally lower than said portion of said contact surface initially contacted by said item are at least 15° from vertical;

e) said contact surface of said resilient, curved finger is elevationally concave; and f) said plurality of resilient, curved fingers are elastomeric.

25. An apparatus as in claim 24 wherein said finger among said plurality of resilient, curved fingers is disposed generally parallel to other fingers among said plurality of fingers when observed in top plan view.

26. An apparatus as in claim 24 wherein said finger among said plurality of resilient, curved fingers is disposed inwardly from said finger's connection with said bracket member toward said first connection area between said arm and said frame when observed in top plan view.

27. An apparatus as in claim 24 wherein said plurality of resilient, curved fingers are of varying lengths, with a more laterally located finger being longer than a more medially located finger.

28. An apparatus as in claim 24 wherein said arm comprises a plurality of selectively adjustable arm members for selectively adjusting total length of said arm.

29. An apparatus as in claim 24 wherein said predetermined distance is less than 16 inches beneath said initial drop area.

30. An apparatus as in claim 29 wherein a portion of said finger among said plurality of fingers most proximate a most proximate portion of a closest, neighboring finger is at least 2¼ but no more than 2¾ inches distant from said most proximate portion of said closest, neighboring finger.

31. An apparatus as in claim 23 wherein:
   a) said bracket member of said directing and cushioning element is arcuate;
   b) said inner surface of said bracket member is concave;
   c) said contact surface of said resilient, curved finger is rounded;
   d) said portion of said resilient, curved finger beneath said initial drop area is disposed such that a portion of said contact surface initially contacted by said item during fall of said item from said source is at least 15° from vertical and all portions of said contact surface elevationally lower than said portion of said contact surface initially contacted by said item are at least 15° from vertical but no more that 45° from vertical;
   e) said contact surface of said resilient, curved finger is elevationally concave;
   f) said plurality of resilient, curved fingers are elastomeric;
   g) said predetermined distance is less than 16 inches beneath said initial drop area; and
   h) a portion of said finger among said plurality of fingers most proximate a most proximate portion of a closest neighboring finger is at least 2¼ inches but no more than 2¾ inches distant from said most proximate portion of said closest, neighboring finger.

32. An apparatus as in claim 31 wherein said finger among said plurality of resilient, curved fingers is disposed generally parallel to other fingers among said plurality of fingers when observed in top plan view.

33. An apparatus as in claim 31 wherein said finger among said plurality of resilient, curved fingers is disposed inwardly from said finger's connection with said bracket member toward said first connection area between said arm and said frame when observed in top plan view.

34. An apparatus as in claim 31 wherein said plurality of resilient, curved fingers are of varying lengths, with a more laterally located finger being longer than a more medially located finger.

35. An apparatus as in claim 31 wherein said arm comprises a plurality of selectively adjustable arm members for selectively adjusting total length of said arm.

36. An apparatus as in claim 31 wherein said predetermined distance is less than 12 inches beneath said initial drop area.

37. A method of directing and cushioning a plurality of items conveyed from an elevated source into a piling area beneath said source, comprising:
   a) providing said plurality of items to be conveyed from said elevated source into said piling area beneath said source;
   b) providing a directing and cushioning element operatively connected to said elevated source and comprising:
      i) a bracket member having an inner surface and an outer surface; and
      ii) a plurality of resilient, curved fingers operatively connected to said bracket member by means for affixing, wherein a finger among said plurality of resilient, curved fingers is disposed with at least a portion of said finger beneath an initial drop area at an operator-controlled, predetermined distance and at an operator-controlled, predetermined, non-vertical angle, such that as an item among said plurality of items falls from said source, said item contacts a contact surface of said finger;
   c) selecting said predetermined distance and said predetermined non-vertical angle;
   d) dropping said plurality of items from said elevated source toward said piling area beneath said source;
   e) contacting an item among said plurality of items with at least a finger among said plurality of resilient, curved fingers during a fall by said item from said source toward said piling area beneath said source, said contacting initially occurring at said operator-controlled, predetermined distance beneath said initial drop area;
   f) absorbing gently at least a portion of kinetic energy of said item by said finger said item contacts during contact between said item and said finger; and
   g) directing gently by contact with said finger said item to a modified path, said modified path being further from vertical than an unmodified path said item would take absent contact with said finger.

38. A method as in claim 37 wherein said plurality of items are a plurality of potatoes and said predetermined distance is less than 16 inches beneath said initial drop area.

39. A method as in claim 38 wherein a portion of said finger among said plurality of fingers most proximate a most proximate portion of a closest, neighboring finger is at least 2¼ but no more than 2¾ inches distant from said most proximate portion of said closest, neighboring finger.

40. A method as in claim 39 wherein said plurality of items are a plurality of potatoes and said predetermined distance is less than 12 inches beneath said initial drop area.

41. A method as in claim 38 wherein said finger among said plurality of resilient, curved fingers is disposed generally parallel to other fingers among said plurality of fingers when observed in top plan view.

42. A method as in claim 38 wherein said finger among said plurality of resilient, curved fingers is disposed inwardly from said finger's connection with said bracket member toward said source when observed in top plan view.

43. A method as in claim 37 wherein:
   a) said bracket member of said directing and cushioning element is arcuate;
   b) said inner surface of said bracket member is concave;
   c) said contact surface of said resilient, curved finger is rounded;
   d) said portion of said resilient, curved finger beneath said initial drop area is disposed such that a portion of said contact surface initially contacted by said item during fall of said item from said source is at least 15° from vertical and all portions of said contact surface elevationally lower than said portion of said contact surface initially contacted by said item are at least 15° from vertical; and
   e) said plurality of resilient, curved fingers are elastomeric.

44. A method as in claim 43 wherein said contact surface of said resilient, curved finger is elevationally concave.

45. A method as in claim 44 wherein said plurality of items are a plurality of potatoes and said predetermined distance is less than 16 inches beneath said initial drop area.

46. A method as in claim 45 wherein a portion of said finger among said plurality of fingers most proximate a most proximate portion of a closest, neighboring finger is at least 2¼ but no more than ¾ inches distant from said most proximate portion of said closest, neighboring finger.

47. A method as in claim 46 wherein said plurality of items are a plurality of potatoes and said predetermined distance is less than 12 inches beneath said initial drop area.

48. A method as in claim 43 wherein said finger among said plurality of resilient, curved fingers is disposed generally parallel to other fingers among said plurality of fingers when observed in top plan view.

49. A method as in claim 43 wherein said finger among said plurality of resilient, curved fingers is disposed inwardly from said finger's connection with said bracket member toward said source when observed in top plan view.

* * * * *